United States Patent
Kawakami

[15] 3,687,038
[45] Aug. 29, 1972

[54] VIEWFINDER SYSTEM FOR A SINGLE LENS REFLEX CAMERA

[72] Inventor: Tadashi Kawakami, Tokyo, Japan
[73] Assignee: Nippon Kogaku K.K., Tokyo, Japan
[22] Filed: March 31, 1971
[21] Appl. No.: 129,797

[30] Foreign Application Priority Data

April 28, 1970 Japan .................. 45/40866

[52] U.S. Cl. ......................... 95/42, 95/44 R
[51] Int. Cl. ............................. G03b 17/20
[58] Field of Search ............ 95/10 R, 42, 44 R

[56] References Cited

UNITED STATES PATENTS

| 3,094,911 | 6/1963 | Reiche et al. | 95/42 X |
| 3,532,043 | 10/1970 | Shimomura et al. | 95/42 |
| 3,250,196 | 5/1966 | Ort et al. | 95/44 |
| 3,218,946 | 11/1965 | Lange | 95/42 X |
| 3,174,416 | 3/1965 | Heerklotz | 95/44 |
| 3,314,345 | 4/1967 | Ebertz et al. | 95/42 X |

*Primary Examiner*—Samuel S. Matthews
*Assistant Examiner*—Richard A. Wintercorn
*Attorney*—Ward, McElhannon, Brooks & Fitzpatrick

[57] ABSTRACT

A view finder system for a single lens reflex camera provided with a display member for displaying various required information such as exposure meter needle, f-number scale, shutter speed scale and other characters or index marks. The display member is disposed relative to a penta prism so that a light beam from said display member is totally reflected by one transmitting surface of said penta prism adjacent to a focusing screen disposed therebelow and directed to an ocular disposed behind said penta prism, and an optical reflecting member is interposed between said penta prism and said ocular for reflecting said light beam at least twice to direct it to said ocular, whereby the various required information displayed by said display member can be clearly viewed in the viewfinder's field of view.

4 Claims, 4 Drawing Figures

VIEWFINDER SYSTEM FOR A SINGLE LENS REFLEX CAMERA

BACKGROUND OF THE INVENTION

1. Field of the Invention

This invention relates to a single lens reflex camera provided with a display member for displaying various required information such as an exposure meter needle, f-number scale, shutter speed scale and other characters or index marks thereby to enable such information to be viewed in the viewfinder's field of view. More particularly, the invention relates to a viewfinder system having such display member disposed in front of a penta prism used in a camera of the described type.

2. Description of the Prior Art

In the known viewfinder system of the described type, the length of the light path from the display member disposed in front of the penta prism to the ocular is much shorter than the length of the light path from the focusing screen to the ocular, and this may lead to an undesirable result wherein the image of the display member fails to be formed at a point conjugate with that of the focusing screen with respect to the ocular. To prevent this, the prior art has resorted either to the provision of an additional prism between the display member and the penta prism to increase the length of the light path and thereby establish a conjugate relationship of light beams from the display member and the focusing screen with respect to the ocular, or to the addition of a lens between the display member and the penta prism so as to establish a conjugate relationship of the display member and the focusing screen with respect to the ocular. In single lens reflex cameras provided with such conventional viewfinder systems, the front face of the penta prism has necessarily been effectively projected due to a substantial amount of space occupied by the prism or lens disposed in the described manner, and this has led to a larger size of the entire camera. The known viewfinder of the described type has also suffered from limitations in that the light beam from the display member must be incident on the penta prism in the vicinity of its front reflecting surface (such as 3a in FIG. 1) in order to form the image of the display member in the vicinity of the viewfinder's field of view.

SUMMARY OF THE INVENTION

Accordingly, the present invention is directed to a viewfinder system for cameras of the class described which overcomes the aforementioned difficulties and disadvantages of the prior art, and which provides an improved viewfinder system for such cameras having a display member for displaying various required information such as an exposure meter needle, f-number scale, shutter speed scale and other characters or index marks thereby to enable such information to be viewed in the viewfinder's field of view.

According to the present invention, the display member is disposed in front of a penta prism so that a light beam from the display member is totally reflected by one transmitting surface of the penta prism which is adjacent to a focusing screen disposed below the penta prism, and then directed to an ocular disposed behind the penta prism. An optical reflecting member is interposed between the penta prism and the ocular for reflecting the light beam from the display member at least twice and thence to direct it to the ocular. Various required information displayed by the display member can thus be clearly viewed in the viewfinder's field of view. The optical reflecting member interposed between the penta prism and the ocular may be a one-piece structure or a composite structure consisting of two separate members. The one-piece or composite optical member is arranged so that the path of the light beam from the display member to the ocular is substantially equal in length to the path of light from the focusing screen to the ocular.

BRIEF DESCRIPTION OF THE DRAWINGS

The invention will be better understood from the following description comparing the prior art system and the inventive system as shown in the accompanying drawings, in which.

DESCRIPTION OF THE PREFERRED EMBODIMENTS

Figure 1:
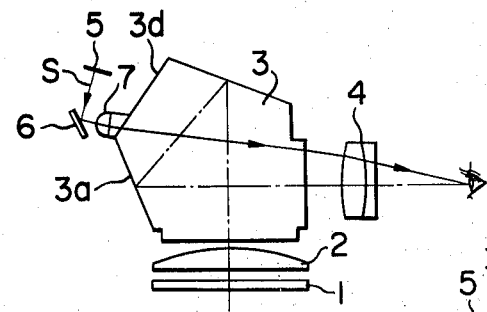
FIG. 1 is a cross-sectional view of the viewfinder system in the single lens reflex camera according to the prior art.

In order better to understand the present invention, a description will first be made of the viewfinder system in the conventional single lens reflex camera as shown in FIG. 1 wherein reference numeral 1 designates a focusing screen on which the image of an object is formed through an objective lens (not shown). Above and adjacent to the focusing screen 1 there is disposed a condenser lens 2, above which is a penta prism 3 having a front reflecting surface 3a and a non-reflecting front surface 3d. Behind the penta prism 3 is disposed an ocular 4 for adjusting the formed image on the focusing screen 1 so as to be viewed more readily.

In front of the penta prism 3 there is provided a display member 5 for displaying various required information including an exposure meter needle, f-number scale, shutter speed scale and other characters or index marks. The display member 5 is so arranged as to be illuminated by light from a lighting window (not shown) and/or an illuminating light source (not shown) provided in the body of the camera. A mirror 6 is disposed in such a manner as to direct a light beam S from the display member 5 through the non-reflecting front surface 3d into the penta prism 3, and adjacent the mirror 6 is a lens 7 arranged to establish a substantially conjugate relationship of light from the display member 5 and the focusing screen 1 with respect to the ocular 4.

Figure 2:
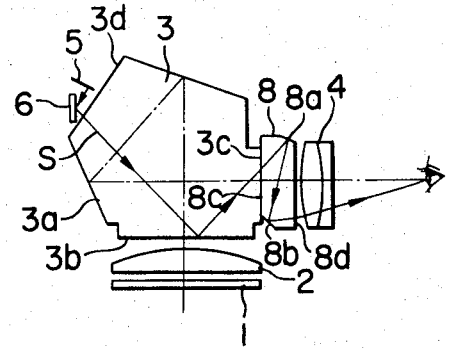
FIG. 2 is a cross-sectional view of the viewfinder system according to an embodiment of the present invention.

FIG. 2 shows the viewfinder system according to an embodiment of the present invention. This system is similar to the conventional system of FIG. 1 in the arrangement of focusing screen 1, condenser lens 2, penta prism 3 having a front reflecting surface 3a and a non-reflecting front surface 3d, ocular 4, display member 5 and mirror 6. In this embodiment, it should be noted that the mirror 6 is arranged so that the light beam S from the display member 5 is directed through the non-reflecting front surface 3d to and totally reflected by the transmitting surface 3b of the penta prism 3 which is adjacent to the focusing screen 1, and is then further directed toward the ocular 4. An optical reflecting member 8 having reflecting surfaces 8a and 8b is interposed between the penta prism 3 and the ocular 4, and is cemented to the transmitting surface 3c of the prism 3 which faces the ocular 4. The opposite transmitting surfaces 8c and 8d of the optical member 8 are parallel to each other. The member 8 is arranged so that the light beam S, after being totally reflected by the transmitting surface 3b of the penta prism 3, is further reflected by the reflecting surfaces 8a and 8b of the optical reflecting member 8 and then enters the ocular 4. It is important to note that the length of the path of the light beam S from the display member 5 to the ocular 4 is substantially equal to the length of the light path from the focusing screen 1 to the ocular 4.

Figure 3:
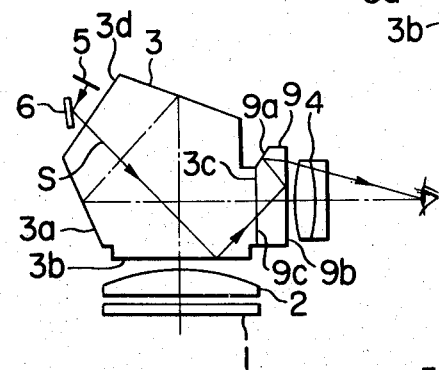
FIGS. 3 and 4 are views similar to FIG. 2 and showing further forms of the present invention.

FIG. 3 shows a further form of the viewfinder system according to the present invention. In this embodiment, an optical reflecting member 9 has a reflecting surface 9a and parallel opposite transmitting surfaces 9b and 9c, so that the light beam S after being totally reflected by the transmitting surface 3b of the penta prism 3 is again totally reflected by the transmitting surface 9b of the optical reflecting member 9, and is then further reflected by the reflecting surface 9a, after which it enters the ocular 4.

Figure 4:
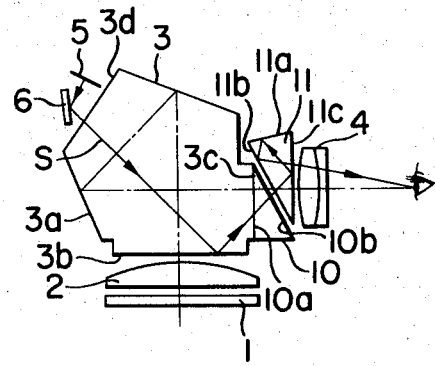

FIG. 4 shows still a further form of the present invention. In this alternative embodiment, it should be noted that the optical reflecting member is constituted by a first optical member 10 and a second optical member 11. The first optical member 10 has a transmitting surface 10a cemented to the transmitting surface 3c of the penta prism 3 which faces the ocular 4, and the second optical member 11 has a reflecting surface 11a. The first and second optical members 10 and 11 are disposed so that their opposed transmitting surfaces 10b and 11b are parallel and very closely spaced apart, and that the transmitting surface 10a of the first optical member 10 which is adjacent to the penta prism 3 is parallel to a transmitting surface 11c of the second optical member 11 which is adjacent to the ocular 4. Thus, the light beam S after being totally reflected by the transmitting surface 3b of the penta prism 3 may again be totally reflected by the transmitting surface 11c of the second optical member 11 and then reflected by the reflecting surface 11a, whereafter the beam S may be further totally reflected by the surface 11b and enter the ocular 4.

Again in the embodiments of FIGS. 3 and 4, the length of the path of the light beam S from the display member 5 to the ocular 4 is substantially equal to the length of the path of light from the focusing screen 1 to the ocular. Members 1 to 6 in these alternative embodiments are arranged in the manner similar to those in the embodiment of FIG. 2.

Thus, in the described various embodiments of the present invention, the display member 5 and the focusing screen 1 satisfy a substantially conjugate relationship with respect to the ocular 4, whereby the image of the display member can be viewed in the viewfinder's field of view. By suitably selecting the point at which the light beam S is reflected on the transmitting surface 3b of the penta prism 3 adjacent to the focusing screen 1, the reflecting surfaces of the optical reflecting member, and the angles of such reflecting surfaces, it is of course possible to position the image of the display member 5 in the vicinity of the viewfinder's field of view even if the point at which the light beam S is incident on the penta prism 3 is arbitrarily selected within the front field range of the penta prism 3.

According to the present invention, as herein described, the display member 5 is disposed just in front of the penta prism 3 so that the light beam S from the display member 5 is totally reflected by the transmitting surface 3b of the prism 3 adjacent to the focusing screen 1 and is reflected at least twice by the optical reflecting member interposed between the penta prism 3 and the ocular 4 so as to establish a conjugate relationship of the display member 5 and the focusing screen 1 with respect to the ocular 4. Such arrangement eliminates the necessity of providing any additional prism or lens in front of the penta prism 3 to provide the described conjugate relationship as has been required in the conventional cameras of the class described, and accordingly eliminates the inconvenience that the front face of the penta prism 3 is projected to increase the size of the camera. Furthermore, the point at which the light beam S is incident on the penta prism 3 may be selected as desired within the front field range of the penta prism 3 in order to form the image of the display member in the vicinity of the viewfinder's field of view, and this is very convenient for practical purposes.

I claim:

1. A viewfinder system for a single lens reflex camera comprising:
    a focusing screen;
    an ocular;
    a penta prism positioned to direct a first light beam passing through the focusing screen into the ocular;
    a display member for displaying various required information such as an exposure meter needle, an f-number scale, a shutterspeed scale and other characters or index marks, wherein said penta prism has a front surface which transmits therethrough a second light beam from the display member;
    a first optical reflecting member positioned to direct the second light beam from the display member through the front surface of the prism for reflection on a surface of said prism adjacent said focusing screen;
    second optical reflecting means interposed between said penta prism and the ocular for at least twice reflecting said second light beam received from the prism and for directing said second light beam into the ocular;
    wherein the length of the light path from said display member to the ocular is substantially equal to the length of the light path from the focusing screen to the ocular.

2. A viewfinder according to claim 1, wherein said second optical reflecting means is mounted on a face of the penta prism opposed to said front surface of said prism.

3. A viewfinder according to claim 1, in which said second optical reflecting means has a pair of opposed light transmitting surfaces disposed in parallel with a rear light transmitting surface of said prism.

4. A viewfinder system for a single lens reflex camera comprising:
  a focusing screen;
  an ocular;
  a penta prism having a front surface and a rear surface, wherein said prism is for receiving a first light beam from the focusing screen and for directing the light beam through said rear surface and into the ocular;
  a display member for displaying various required information such as an exposure meter needle, an f-number scale, a shutter-speed scale and other characters or index marks;
  means for directing a second light beam from said display member through said front surface of said penta prism, and through said rear surface of said prism and into said ocular;
  optical reflecting means interposed between said penta prism and the ocular for at least twice reflecting said second light beam, and for passing said first light beam directly therethrough and into said ocular;
  wherein the length of the light path from said display member to the ocular is substantially equal to the length of the light path from the focusing screen to the ocular.

* * * * *